United States Patent
Miyamoto et al.

[11] Patent Number: 5,083,022
[45] Date of Patent: Jan. 21, 1992

[54] SCANNING TUNNELING MICROSCOPE

[75] Inventors: Hirofumi Miyamoto; Tsugiko Takase; Takao Okada; Shuzo Mishima; Hiroko Ohta, all of Hachioji, Japan

[73] Assignee: Olympus Optical Co., Ltd., Tokyo, Japan

[21] Appl. No.: 589,491

[22] Filed: Sep. 27, 1990

[30] Foreign Application Priority Data

Oct. 2, 1989 [JP] Japan .................. 1-257521
May 14, 1990 [JP] Japan .................. 2-134837

[51] Int. Cl.$^5$ ............................ H01J 37/00
[52] U.S. Cl. ........................ 250/306; 250/307
[58] Field of Search ............... 250/306, 423 F, 440.1, 250/442.1, 307

[56] References Cited

U.S. PATENT DOCUMENTS

| | | |
|---|---|---|
| 3,019,705 | 2/1962 | Wilkinson . |
| 4,343,993 | 8/1982 | Binnig et al. ............... 250/306 |
| 4,676,608 | 6/1987 | Faubion . |
| 4,914,293 | 4/1990 | Hayashi et al. ............. 250/306 |
| 4,992,728 | 2/1991 | McCord et al. ............. 250/306 |
| 4,999,495 | 3/1991 | Miyata et al. .............. 250/306 |

FOREIGN PATENT DOCUMENTS

| | | |
|---|---|---|
| 0027517 | 4/1981 | European Pat. Off. . |
| 0331148 | 9/1989 | European Pat. Off. . |

OTHER PUBLICATIONS

IBM Technical Disclosure Bulletin, vol. 30, No. 5, Oct. 1987, pp. 369-370, Armonk, N.Y., Optically Transparent Tip for Tunneling Microscopy.

Journal of Vacuum Science & Technology: Part A, vol. 6, No. 2, Mar./Apr. 1988, pp. 383-385, New York, Design of a Scanning Tunneling Microscope for Biological Applications.

*Primary Examiner*—Bruce C. Anderson
*Attorney, Agent, or Firm*—Frishauf, Holtz, Goodman & Woodward

[57] ABSTRACT

A scanning tunneling microscope includes an observation optical system for optically observing the surface of an object. The optical system is fixed on an optical system fixing member. The optical system is moved in a direction (Z-direction) vertical to the surface of the object by means of a motor, whereby the focal point of the optical system is adjusted. An STM measurement probe supported by an optically transparent member is disposed between the optical system and the object. When the object is optically observed, the probe is displaced from the focal point by means of a micrometer. Thus, an optical observation image of the surface of the object, which is not affected by the shadow of the probe, can be obtained. When the STM measurement is carried out, a probe unit enables the probe to scan the surface of the object, and an STM image is obtained by a conventional method.

13 Claims, 12 Drawing Sheets

SCANNING TUNNELING MICROSCOPE

BACKGROUND OF THE INVENTION

1. Field of the Invention

The present invention relates generally to a scanning tunneling microscope, and more particularly to a scanning tunneling microscope having an observation optical system for optically observing an object.

2. Description of the Related Art

A scanning tunneling microscope (STM) was proposed by Binnig et al. in 1982 in U.S. Pat. No. 4,343,993. A sharply pointed probe is approached to the surface of an object, and a bias voltage is applied between the probe and the object. Consequently, a tunnel current flows between the probe and the object. It is known that the distance between the probe and the object varies by about one Angstrom, and that the tunnel current varies by about one order of magnitude. The STM utilizes the property of the tunnel current, thereby measuring the surface configuration of the object in an atomic level. For example, the probe is scanned across the surface of the object, while the distance between the object and the probe is servo-controlled by a piezoelectric element to keep the value of the tunnel current constant. The voltage of a servo control signal is recorded to obtain an image reflecting the surface configuration of the object in an Angstrom level.

The resolution of the STM is very high. Thus, the STM is not suitable for object observation with low magnifying power, for selecting an observation region. Due to this situation, there has been proposed an STM in which an optical microscope is built (hereinafter, called "optical microscope-built-in STM"). This type of STM includes an observation optical system capable of optically observing the surface of the object simultaneously with the STM measurement.

In an optical microscope-built-in STM, a probe supported by an optically transparent support member is situated between an objective lens and an object. In the optical microscope built-in STM, optical object observation is performed prior to STM object observation. A target location for STM observation (using a probe) is recognized in the form of the shadow of the probe within an optical microscopic visual field. The shadow of the probe interrupts the optical observation. In addition, when the surface of the object is optically observed in the stage wherein the optical microscopic focal point is close to the tip of the probe, the tip of the probe may contact the object owing to the unevenness of the surface of the object, and the probe may be damaged.

Another problem of the STM resides in the electrode for applying electric power to an object. In the STM, an electrode must be provided on the object, in order to apply a bias voltage across the object and the probe and to detect a tunnel current flowing across the object and the probe. The electrode must be replaced each time the object is changed. In order to omit the replacement step, an object table for placing the object thereon has conventionally been used as an electrode, whereby a bias voltage is applied through the object table. However, since the area of the object table (or the electrode) is large, the influence due to external electromagnetic noise is serious, and a detection value of a tunnel current is adversely affected by the noise. As a result, it is difficult to obtain an exact STM image reflecting the surface of the object.

Still another problem of the STM is the leakage of current to a probe. It is common practice that the probe of the STM is driven by a piezoelectric driving element. Since a high voltage is applied to the driving electrode of the piezoelectric driving element, current leaks from the driving electrode to the probe. Thus, a noise component is contained in the detected tunnel current.

SUMMARY OF THE INVENTION

An object of the present invention is to provide a scanning tunneling microscope wherein an optical observation image of an object, which is free from the shadow of a probe, can be obtained, and there is no possibility that the probe will be damaged.

Another object of the invention is to provide a scanning tunneling microscope capable of obtaining a noise-free STM image.

The scanning tunneling microscope of the invention comprises an optical system, including an objective lens, for optically observing the surface of the object, first rough movement means for supporting the objective lens and moving the objecting lens along the optical axis of the optical system, a probe unit having a probe for detecting a tunnel current, an optically transparent member for supporting the probe along the optical axis, and a piezoelectric driving body for causing the probe to scan the surface of the object, and second rough movement means for supporting the probe unit and moving the probe unit along the optical axis.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 16A and 6B, and 17A and 17B illustrate the process of auto-approach of the observation optical system;

DETAILED DESCRIPTION OF THE PREFERRED EMBODIMENTS

An embodiment of the present invention will now be described with reference to the accompanying drawings.

Figure 1:
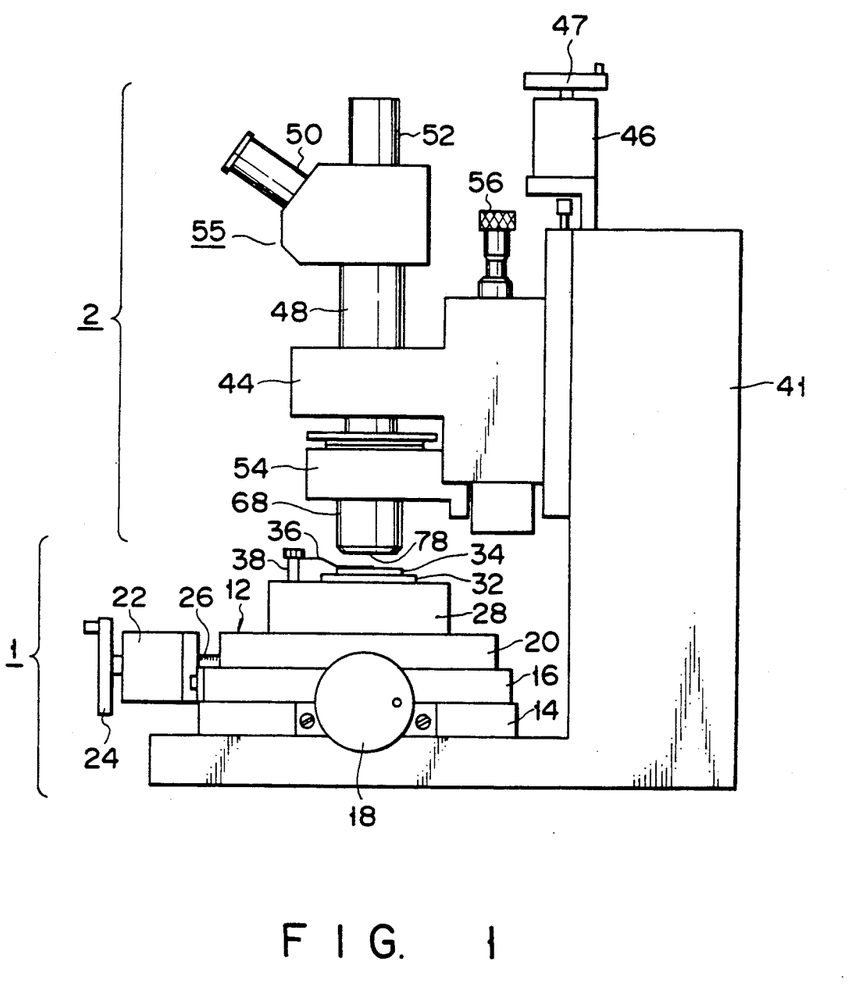
FIG. 1 shows the overall structure of a scanning tunneling microscope according to the present invention.

FIG. 1 shows the overall structure of a scanning tunneling microscope (STM) according to this embodiment. The STM comprises mainly a stage system 1 for mounting and moving an object, and an object observation system 2 for optically observing the object or for observing the object by means of the STM. First, the stage system 1 will now be described.

The STM is provided with an XY-stage 12 for moving an object in an XY-plane. The XY-stage 12 comprises a base table 14 fixed on a bottom portion of the body. An X-position setting slide plate 16, which is slidable in a direction vertical to the face of FIG. 1 (hereinafter called "X-direction"), is disposed on the base table 14. The slide plate 16 is moved in the X-direction in accordance with the rotation of an X-directional operation dial 18. A Y-position setting slide plate 20 situated on the X-position setting slide plate 20, such that the Y-position setting slide plate 20 is movable in a direction from the left to the right or from the right to the left on the face of FIG. 1 (hereinafter called "Y-direction"). The X-position setting slide plate 16 has, on its side face, a motor 22 for moving the Y-position setting slide plate 20. The motor 22 is provided with a Y-directional operation dial 24 for fine movement. The Y-position setting slide plate 20 is moved in the Y-direction by means of an operation rod 26 in accordance with the rotation of the operation dial 24 or motor 22. The operation rod 26 is advanced or retreated by means of a feed screw mechanism.

Figure 2:
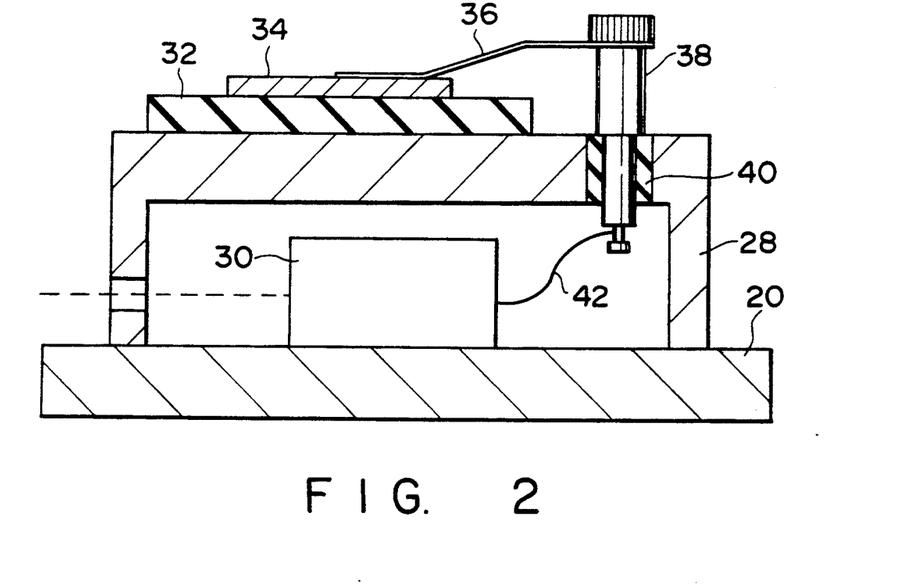
FIG. 2 is a cross-sectional view of the structure of an object table shown in FIG. 1.

FIG. 2 is a cross-sectional view showing the structure of the object table shown in FIG. 1. An object table 28 made of an electrically conductive metal is mounted on the Y-position setting slide plate 20. A preamplifier 30 is disposed within the object table 28. An object stage 32 made of an insulator material is mounted on the object table 28. An object 34 is placed on the object stage 32. The object 34 is sandwiched between the object stage 32 and an electrically conductive holder 36. The holder 36 is attached to an upper end portion of a fixing member 38 made of an electrically conductive material. The fixing member 38 is secured to the object table 28, with an insulator 40 interposed therebetween. A lower end portion of the fixing member 38 is electrically connected to the preamplifier 30 within the object table 28 by means of a lead wire 42.

Figure 3:
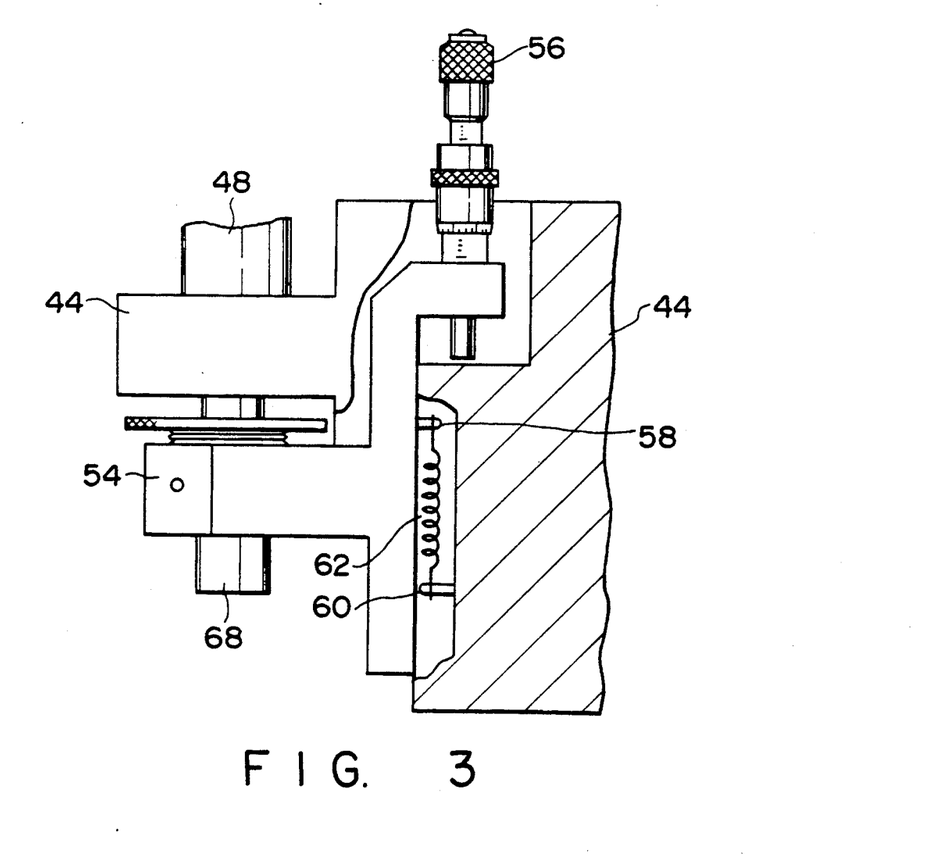
FIG. 3 is a partial cross-sectional view showing the movement mechanism for moving a probe unit shown in FIG. 1.

Referring to FIGS. 1 and 3, the structure of the object observation system 2 will now be described. The STM according to this embodiment includes an optical system fixing member 44 which can be moved by means of a linear guide (not shown) in the vertical direction (Z-direction) relative to a column 41. The column 41 stands on the bottom portion of the STM body. The optical system fixing member 44 is moved vertically in accordance with the rotation of a motor 46 attached to an upper part of the STM body, or an operation dial 47 provided on the motor 46. A lens-barrel 48 is vertically mounted on the optical system fixing member 44. An upper part of the lens-barrel 48 is provided with an object observation optical system 55 having an optical microscopic eyepiece 50 and a video camera attaching cylinder 52. A vertically movable probe unit support member 54 is situated below the optical system fixing member 44. The probe unit support member 54 is movable vertically (Z-direction) by means of a linear guide (not shown) relative to the optical system fixing member 44. As is shown in FIG. 3, the probe unit support member 54 is positioned in the Z-direction by means of a micrometer 56 attached to an upper end portion of the support member 54. A spring 62 is fixed at both ends to support pins 58 and 60 attached respectively to the probe unit support member 54 and the optical system fixing member 44. The spring 62 allows the probe unit support member 54 to move smoothly.

Figure 4:
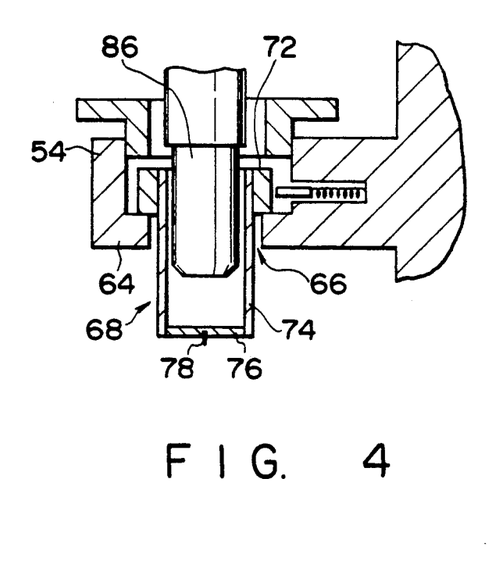
FIG. 4 is a cross-sectional view showing a probe unit and a probe unit supporting section.
Figure 5:
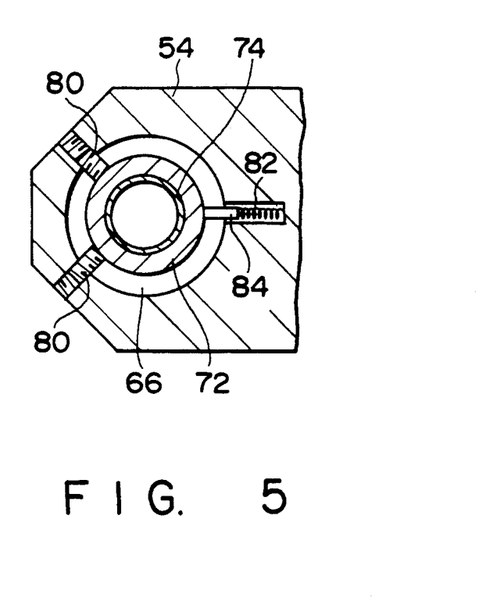
FIG. 5 shows a mechanism for positioning the probe unit.

A probe unit 68 and a probe unit support mechanism will now be described with reference to FIGS. 4 and 5. The probe unit support member 54 has a circular opening 66 and an annular projection 64 at its lower part. The probe unit 68 comprises an annular support member 72 and a cylindrical piezoelectric actuator 74 having an upper end portion secured to the annular support member 72. A probe holder 76 or an optically transparent plate, such as a cover glass plate, is provided at a lower end of the actuator 74. A probe 78 is erected on a center portion of the probe holder 76. The annular support member 72 is situated within the space defined by the opening 66 of the probe unit support member 54 and screws 80, whereby the probe unit 68 is supported. The annular support member 72 of the probe unit 68 is pushed in three directions by means of the two screws 80 and a pin 84. The pin 84 is movably supported by a spring 82. By adjusting the screws 80, the probe 78 is aligned with the optical axis (not shown) of the object observation optical system 55.

Figure 6A:
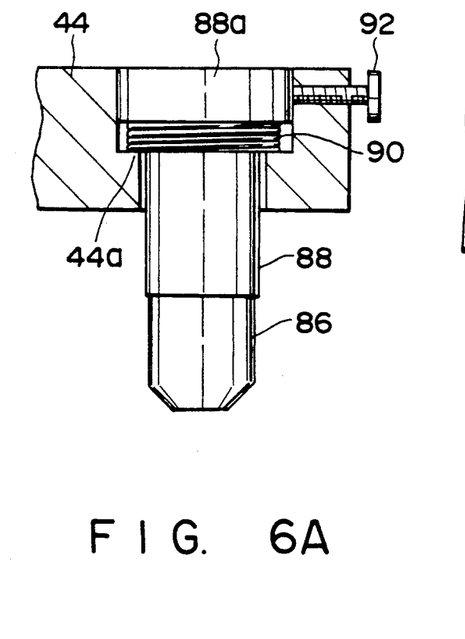
FIGS. 6A and 6B illustrate a mechanism for supporting an objective lens.
Figure 6B:
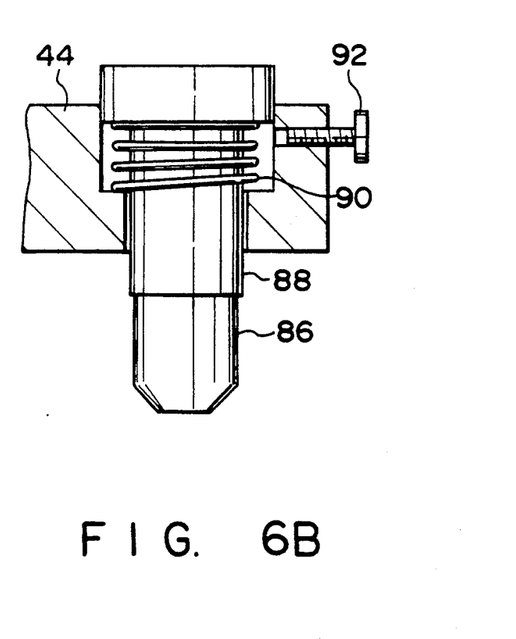

An objective lens 86 having its upper part supported by the optical support member 44 is situated within the cylindrical piezoelectric actuator 74 of the probe unit 68. In FIGS. 6A and 6B, the objective lens 86 is screwed into a support member 88 having a flange portion at its upper end portion. The support member 88 is supported in the opening defined by the optical system fixing member 44 and an annular projection 44a provided at a lower end portion of the fixing member 44. A coil spring 90 surrounding the support member 88 is placed between the flange portion 88a and the annular projection 44a. The optical system fixing member 44 has a lock screw 92 for fixing the support member 88. The objective lens 86 is secured to the optical system fixing member 44, as shown in FIG. 6A, in the following manner: the flange portion 88a of the support member 88 is pushed in the opening in the optical system fixing member 44 against the force of the coil spring 90, and, in this state, the lock screw 92 is fastened. When the objective lens 86 is replaced, the lock screw 92 is loosened. Then, the support member 88 is raised by the force of the coil spring 90, as shown in FIG. 6B. This makes easier the step of replacing the objective lens 86.

A description will now be given of how the above-described STM is operated to observe an object.

Figure 7A:
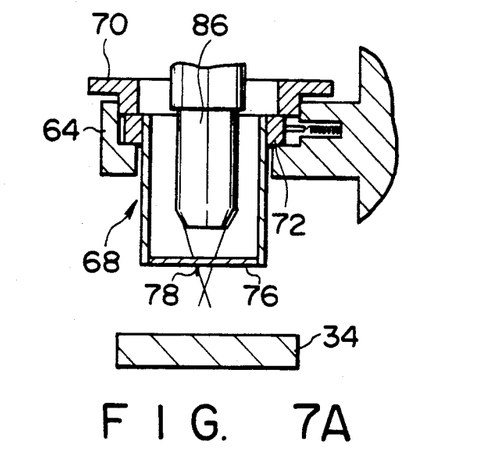
FIGS. 7A to 7F illustrate the process of moving the probe to the position of the axis of an object observation optical system.
Figure 7B:
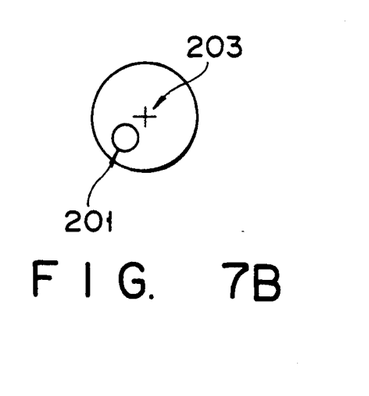
Figure 7C:
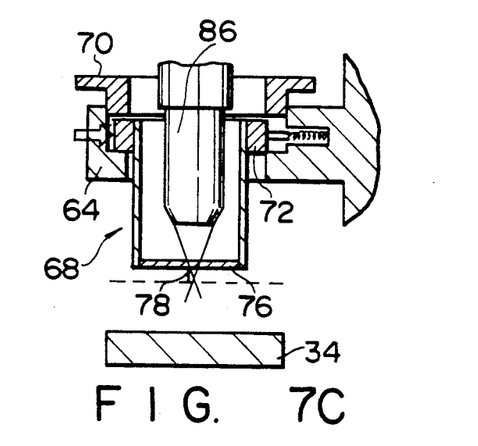
Figure 7D:
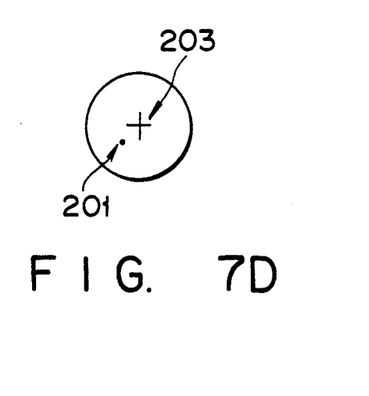
Figure 7E:
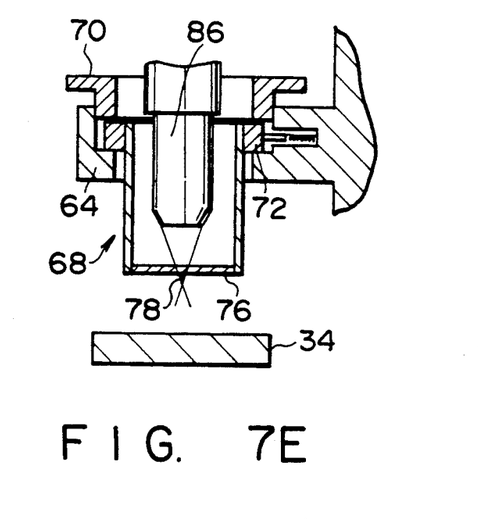
Figure 7F:
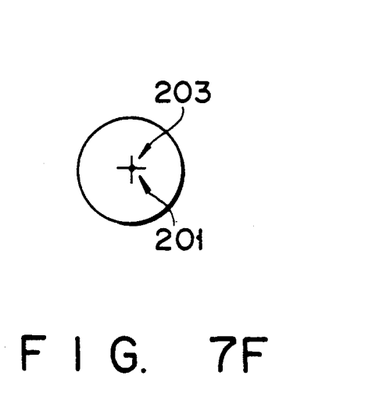

According to the STM of this embodiment, it is necessary to set an observation region on the object prior to the STM observation and to confirm the position of the probe in real time during the STM observation. For this purpose, the axis of the probe is aligned with the optical axis of the object observation optical system 55. The process for the alignment will now be explained with reference to FIGS. 7A to 7F. In order to prevent the probe 78 from contacting the object 34, the optical system fixing member 44 is moved upwards by the motor 46 or a first rough movement mechanism. Then, the support member 54 including the probe unit 68 is vertically moved by the micrometer 56 or a second rough movement mechanism, whereby the tip portion of the probe 78 is located at the focal point of the objective lens 86. At this time, the positional relationship between the probe 78 and the objective lens 86 is shifted from the state shown in FIG. 7A to the state shown in FIG. 7C. FIG. 7B shows a probe image 201 observed through the object observation optical system 55, which is out of focus. This out-of-focus image 201 is focused, as shown in FIG. 7D. Then, the screws 80 shown in FIG. 5 are adjusted so as to make the probe 78 coincide with a reticle 203 in the eyepiece 50. The two screws 80 are suitably rotated to shift the positional relationship between the probe 78 and the objective lens 86 from the state shown in FIG. 7C to that shown in FIG. 7E. Thus, the probe image 201 obtained by the optical microscope 54 is positioned at the reticle 203, as shown in FIG. 7F.

The focus adjustment of the observation optical system will now be described. As has been stated above, after the probe 78 is aligned with the optical axis of the object observation optical system 55, the object 34 is optically observed. The focus adjustment of the optical system is performed in the following manner: the motor 46 provided at the upper part of the body or the dial 47 is operated to vertically move the optical system fixing member 44. At this time, the shadow of the probe appears in the visual field of the microscope. To cope with this problem, the probe 78 is raised relative to the optical system fixing member 44 by means of the micrometer 56. Thus, the shadow of the probe 78 is not recognized, and a shadow-free optical observation image can be obtained.

The STM measurement of the surface of the object by the STM will now be described. The potential of the object table 28 and the Y-position setting slide plate 20 is set to a ground level, and a bias voltage is applied to the probe 78. The probe 78 is approached to the object 34 by means of the micrometer 56. When the probe 78 is approached to the object 34 at a predetermined distance, a tunnel current starts to flow between the object and the probe. The tunnel current is supplied to the preamplifier 30 through the holder 36 and is amplified. The voltage applied to the cylindrical piezoelectric actuator 74 is controlled so as to keep the tunnel current at a predetermined value through a servo circuit (not shown). Thus, the probe 78 is enabled to trace the surface of the object precisely. The applied voltage on the surface of the object is monitored, using XY-coordinates, whereby an STM observation image can be obtained, like the conventional STM.

According to the STM of this embodiment, when the probe is set in the STM observation region by means of the optical microscope prior to the STM observation, the optical observation image of the surface of the object, which is free from the shadow of the probe, can be obtained. In addition, during the STM observation, the optical microscopic observation of the object surface can be made, and the position of the probe can be recognized in real time.

According to the STM of the above embodiment, the object 34 is electrically connected to the preamplifier 30 through the holder 36. Thus, the connection between the object 34 and the preamplifier 30 can be easily attained. In the prior art, when the object is replaced, an electrode must be provided on the object; however, in this invention, the electrical connection is attained by the holder 36. Since the object 34 and the preamplifier 30 is very closely arranged, external noise can be reduced, compared to the case where the preamplifier is provided on another part. Furthermore, since the potential of the metallic object table 28 is kept at a ground level, electromagnetic noise affecting the object 34 through the inside of the apparatus can be reduced. Specifically, the object table 28 serves as a girdling member (isolated electrode) for the object 34, and cuts electromagnetic noise. The object table 28 and the Y-position setting slide plate 20, which have a ground potential, serve as a shield casing for the preamplifier 30 and prevent external electromagnetic noise from affecting the amplifier unit.

If a signal line, through which a bias voltage is applied and a tunnel current is detected, is connected to the probe-side, the potential of the surface of the object can be set to a ground level and the object can be protected against external noise. That is, it becomes possible to prevent the phenomenon in which the tunnel current noise increases in accordance with the increase in surface area of the object.

In the structure shown in FIG. 1, it is possible that a rotational structure is provided under the X-position setting slide plate 16 so that the object 34 may be rotated along with the object stage 32 in the XY-plane. In this case, after the optical axis of the observation optical system 55 is aligned with the probe 78 and the observation area on the object, the X- and Y-axes of the probe scan can coincide with those on the object stage. The direction of the obtained STM image can be desirably adjusted.

Another embodiment of the present invention will now be described. In this embodiment, the second rough movement mechanism or micrometer 56 is replaced with a motor type micrometer 56B and a Z-directional movement control circuit of the optical system.

Figure 8:
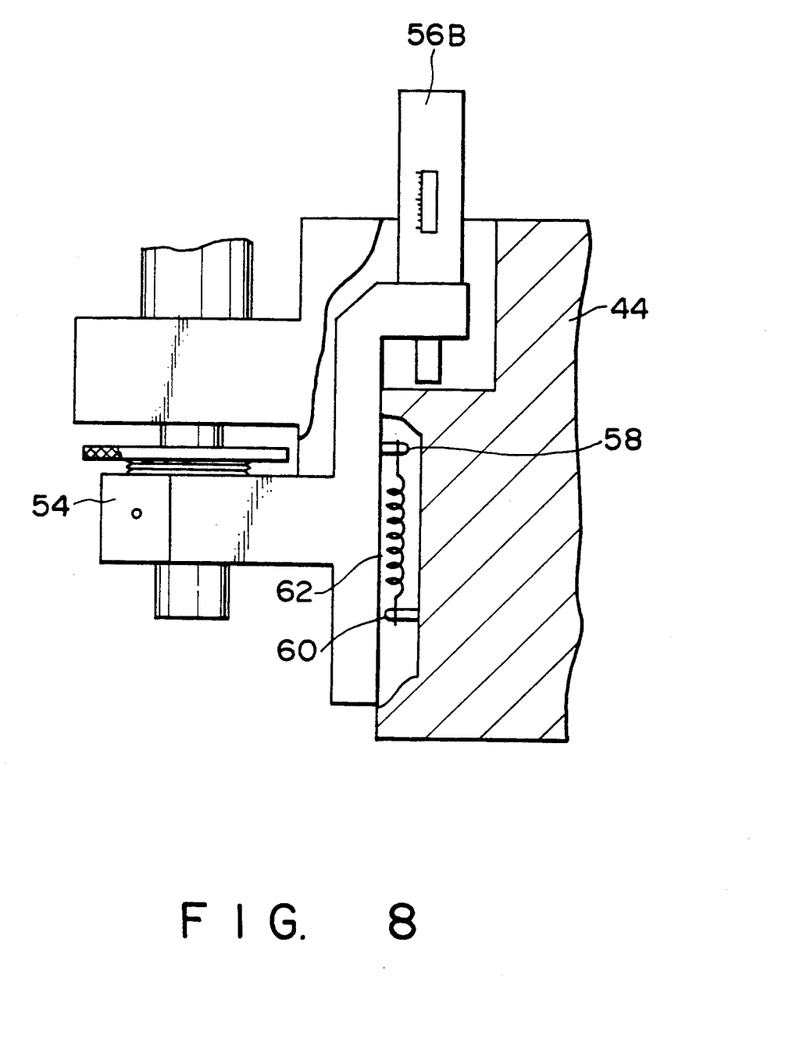
FIG. 8 shows an alternative to the movement mechanism shown in FIG. 3.

As is shown in FIG. 8, the motor type micrometer 56B is disposed in the same manner as the micrometer 56 of the first embodiment. The motor for driving the motor type micrometer 56B is controlled by a drive circuit (described later).

Figure 9:
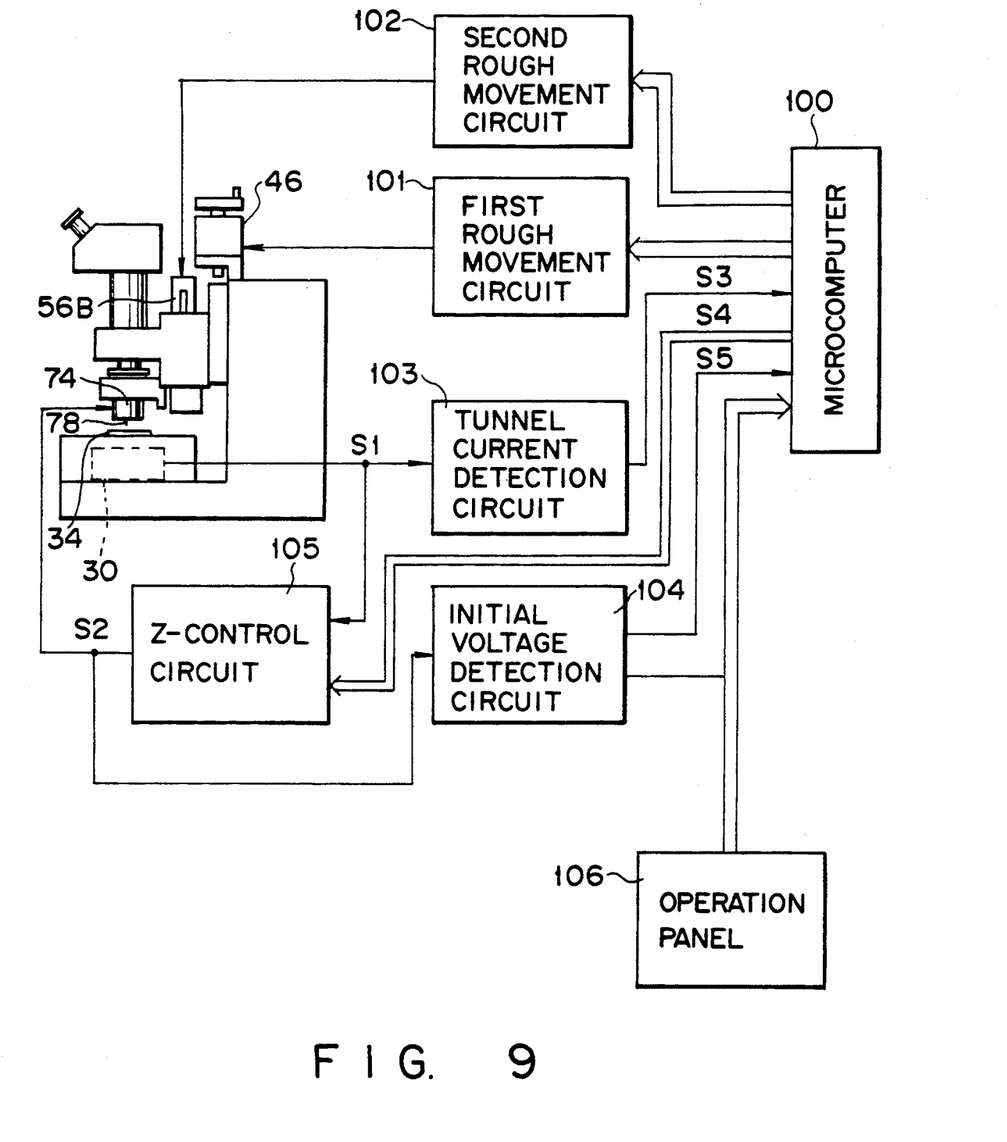
FIG. 9 shows a Z-directional movement control circuit of the observation optical system.

FIG. 9 shows the structure of the Z-directional movement control circuit. In FIG. 9, a first rough movement circuit 101 drives the motor 46 for moving the optical system fixing member 44. A second rough movement circuit 102 drives the motor type micrometer 56B. The circuits 101 and 102 are controlled by signals from a microcomputer 100.

Figure 10:
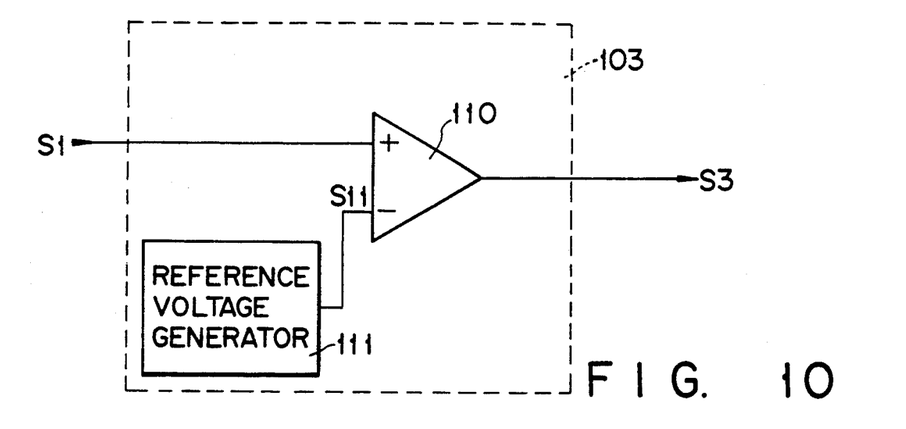
FIG. 10 shows a tunnel current detection circuit.

Referring now to FIG. 10, a tunnel current detection circuit 103 has a comparator 110 and a reference voltage generator 111. The comparator 110 compares a tunnel current voltage signal S1 from the preamplifier 30 and a small tunnel current reference voltage signal S11 generated from the reference voltage generator 111. The comparator 110 outputs a tunnel current detection signal S3 to the microcomputer 100. The detection signal S3 is a binary signal representing whether or not the tunnel current has been detected.

Figure 11:
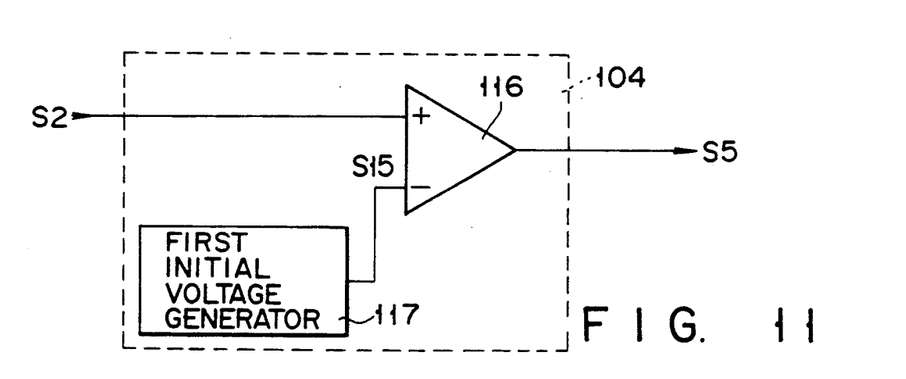
FIG. 11 shows an initial voltage detection circuit.

FIG. 11 shows an initial voltage detection circuit 104 which includes a comparator 116 and a first initial voltage generator 117. The comparator 116 compares a Z-control signal S2 for controlling the Z-directional retraction amount of the cylindrical piezoelectric actuator 74 and an initial voltage signal S15 generated from the initial voltage generator 117 (signal S15 represents the voltage at which the length of the cylindrical piezoelectric actuator 74 is set to a reference or initial value $L_0$). The comparator 116 outputs an initial voltage detection signal S5 to the microcomputer 100. The detection signal S5 is a binary signal representing whether the length of the cylindrical piezoelectric actuator 74 is longer or shorter than the reference value $L_0$.

Figure 12:
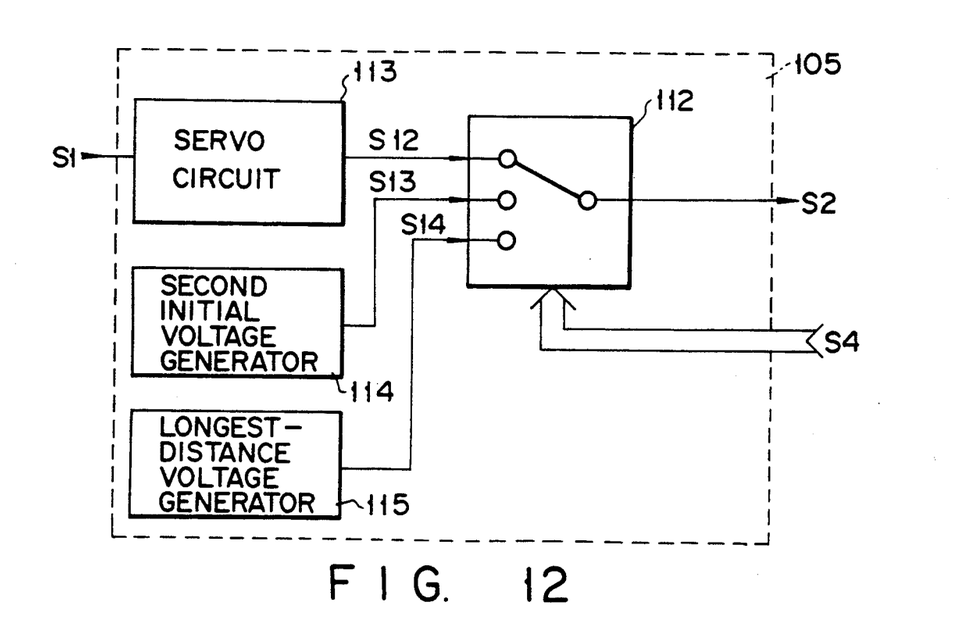
FIG. 12 shows a Z-control circuit.

Referring now to FIG. 12, the Z-control circuit 105 comprises a servo circuit 113, a second initial voltage generator 114, a longest-distance voltage generator 115, and an analog switch 112. The servo circuit 113 receives the tunnel current voltage signal S1 from the preamplifier 30 and varies the voltage applied to the cylindrical piezoelectric actuator 74 so as to keep the constant signal S1 constant, thereby controlling the Z-directional position of the probe 78. The second initial voltage generator 114 generates a voltage capable of setting the length of the piezoelectric actuator 74 supporting the probe 78 to the reference length $L_0$. The longest distance voltage generator 115 generates a voltage capable of setting the position of the piezoelectric actuator 74 supporting the probe 78 to its most retracted position, that is, capable of setting the distance between the probe and the object to a maximum. The analog switch 112 receives a Z-control switching signal S4 from the microcomputer 100 to select one of the output signals from the servo circuit 113, second initial voltage generator 114, and longest distance voltage generator 115.

Figure 18:
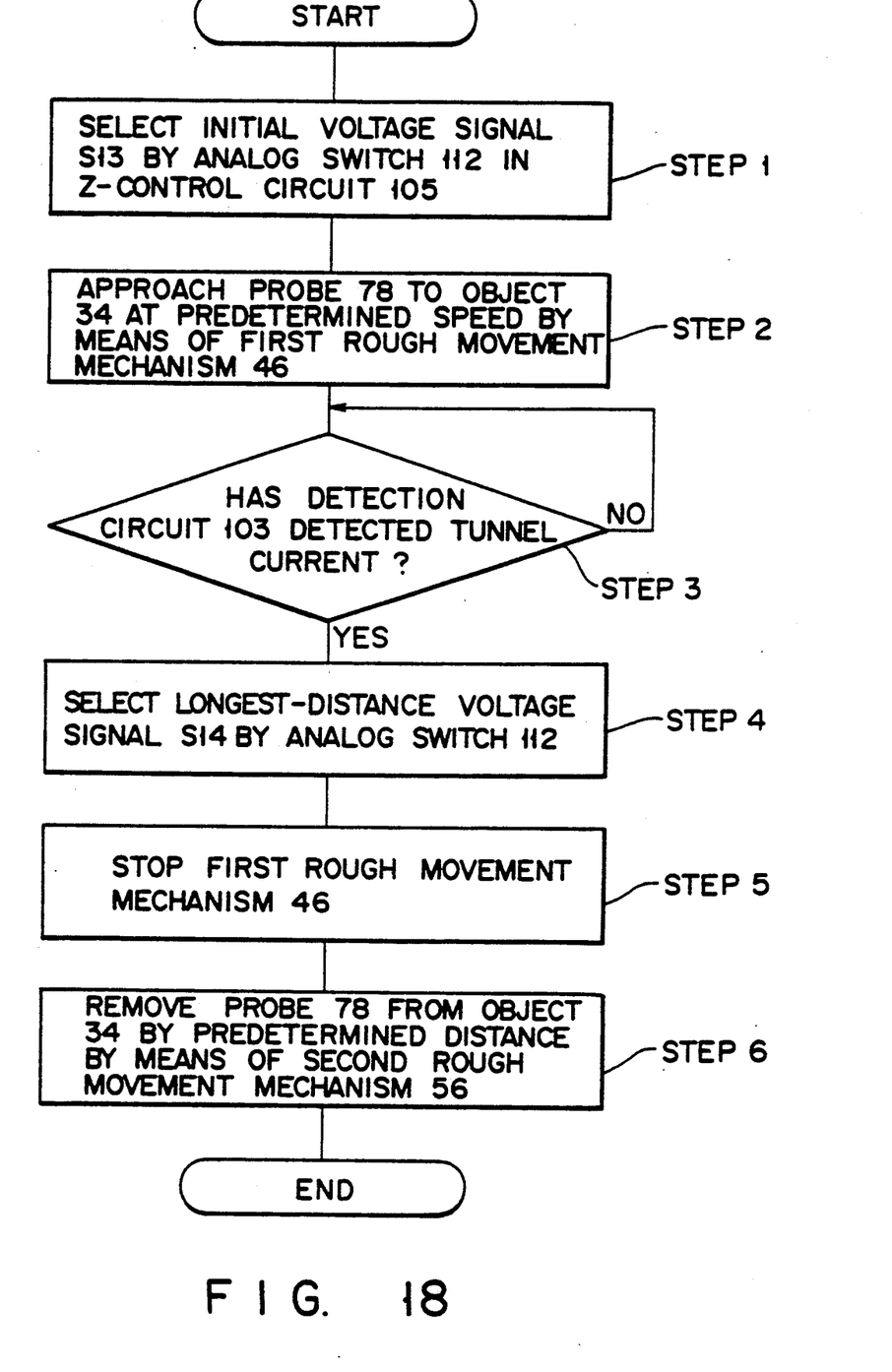
FIG. 18 is a flowchart for illustrating the auto-focus operation of the observation optical system.

The process of the auto-focus operation of the above-described STM will now be described with reference to FIGS. 13A, 13B, 14A, 14B, 15A and 15B, and the flowchart of FIG. 18.

Figure 13A:
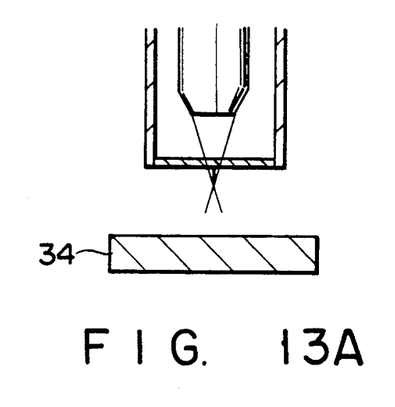
FIGS. 13A and 13B, 14A and 14B, and 15A and 15B illustrate the process of auto-focusing in the observation optical system.
Figure 13B:
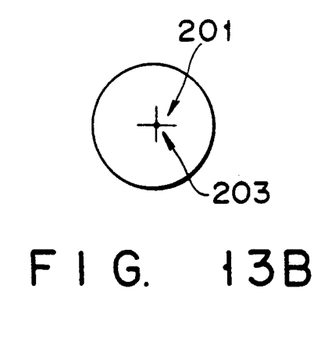
Figure 14A:
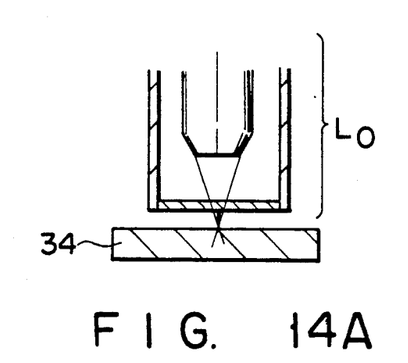
Figure 14B:
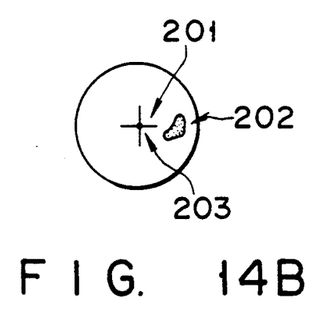
Figure 15A:
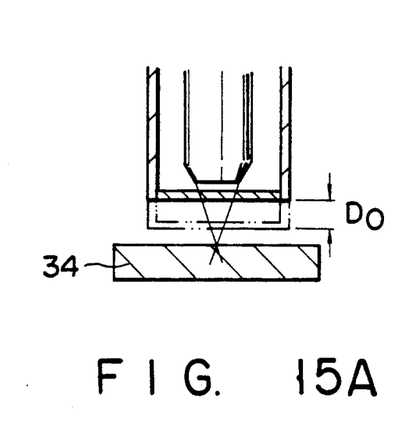
Figure 15B:
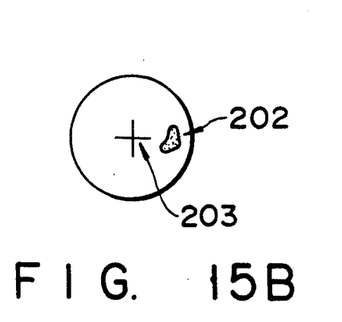

FIG. 13A shows the state wherein the tip portion of the probe 78 is positioned at the focal point of the objective lens 86 in advance and the probe image 201 is made to coincide with the reticle 203 by the above-mentioned method. In this state, an optical image in which the reticle 203 coincides with the probe image 201 is obtained, as shown in FIG. 13B (step 1). An auto-focus command is input from the operation panel 106, and the optical system fixing member 44 is moved downwards by the motor 46 (first rough movement mechanism). Thus, the probe unit 68 and the object lens 86, as one body, approach the object 34 (step 2). During this time, the microcomputer 100 continues to monitor the tunnel current detection signal S3 output from the tunnel current detection circuit 103 (step 3). When the signal S3 varies, the Z-control switching signal S4 is immediately output in order to avoid the collision between the probe 78 and the object 34. The analog switch 112 in the Z-control circuit 105 shown in FIG. 12 selects the longest distance voltage signal S14 (step 4) and the motor 46 is stopped. At this time, the focal point of the objective lens 86 is located on the surface of the object, as is shown in FIG. 14A, and an optical image as shown in FIG. 14B is obtained (Step 5). In this state, the probe image 201 makes the optical observation difficult. Thus, the probe unit support member 54 is moved by the motor type micrometer 56B (second rough movement mechanism) so that the tip of the probe 78 may be defocused. The probe unit 68 is moved upwards by a predetermined distance $D_0$, as is shown in FIG. 15A, and an optical image which is not affected by the probe 78 is obtained, as shown in FIG. 15B (step 6). If the focal point is set at the tip of the probe 78 in advance, by this sequence of operation, the surface of the object can be automatically observed in a focused stated. Since the probe 78 is separated from the object 34 by the distance $D_0$, the object can be moved without a concern that the probe 78 does not collide with the object 34, and the STM observation target portion 202 on the surface of the object can be positioned at the reticle 302 or the probe position.

Figure 19:
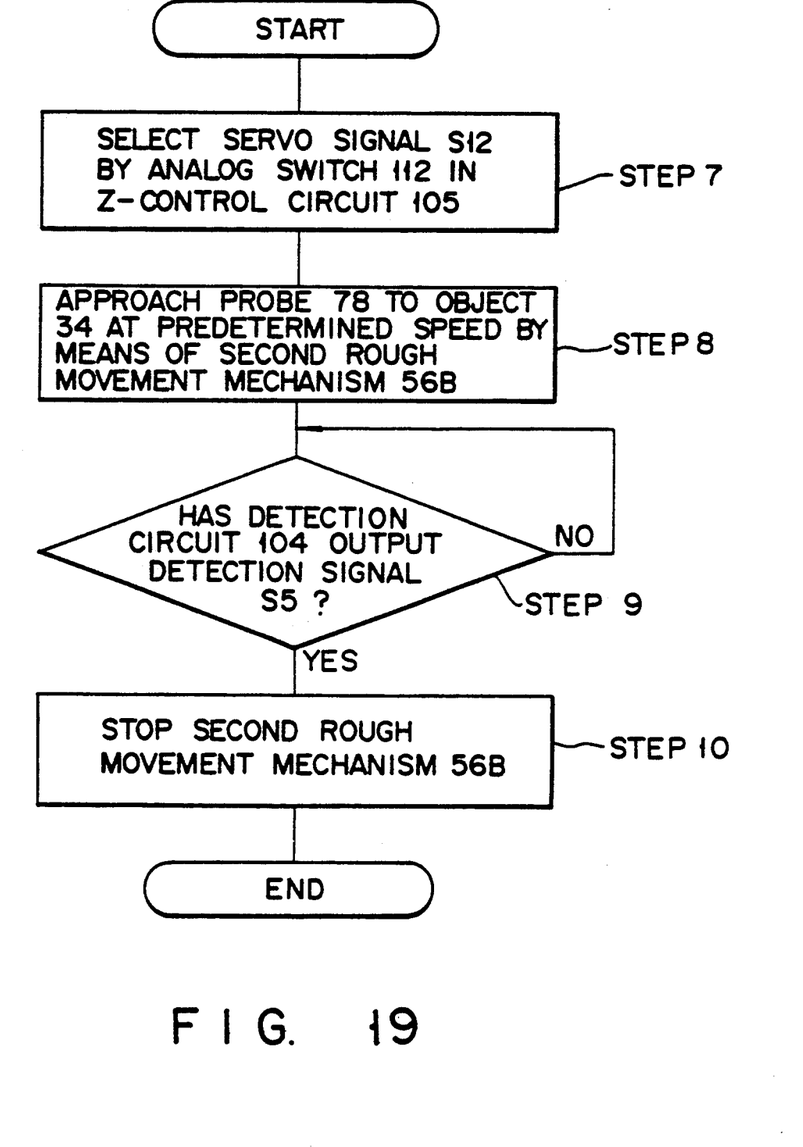
FIG. 19 is a flowchart for illustrating the auto-approach operation of the observation optical system.

Referring to the flowchart of FIG. 19, a description will now be given of the sequence of the auto-approach operation for approaching the tip of the probe to the tunnel region on the object 34 by means of the motor type micrometer 56B and the Z-directional movement control circuit shown in FIG. 9.

Figure 16A:
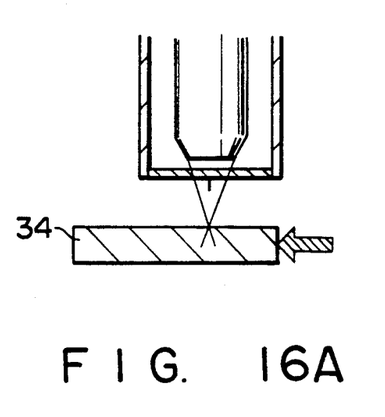
Figure 16B:
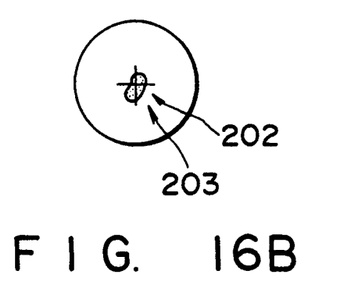
Figure 17A:
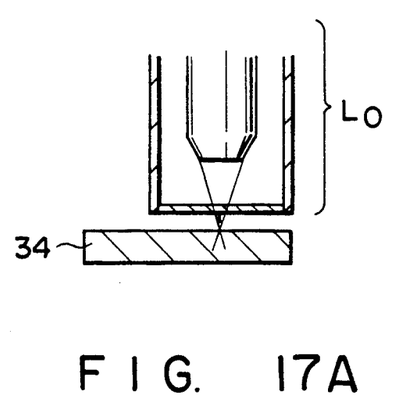
Figure 17B:
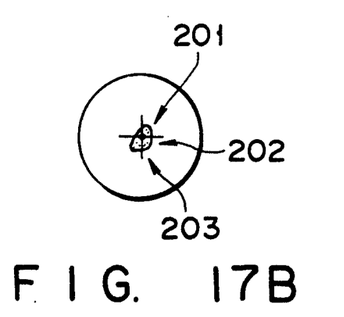

FIG. 16A shows the state wherein the object stage 32 is moved so as to position the STM observation target portion 30 at the reticle 203 after the observation optical system 55 was set in focus by the above-described autofocus sequence. An optical image in this state is shown in FIG. 16B. When an auto-approach command is input from the operation panel 106 shown in FIG. 9, the microcomputer 100 outputs a signal to the Z-control circuit 105 so that the circuit 105 selects the Z-servo signal S12 (step 7). The cylindrical actuator 74 is extended to a maximum until the tunnel current begins to flow. The probe unit support member 54 is moved downwards to approach the object by means of the second rough movement mechanism or the motor type micrometer 56B (step 8). Then, the microcomputer 100 continues to monitor the initial voltage detection signal S5 from the initial voltage detection circuit 104 shown in FIG. 11. The detection signal S5 varies when a tunnel current begins to flow between the probe and the object and the cylindrical piezoelectric actuator 74 is retracted to a predetermined length (reference length $L_0$) in accordance with the movement of the probe unit 68 (step 9). When the microcomputer 100 detects the variation of the detection signal S5, it immediately stops the motor type micrometer 56B (step 10). As a result, the length of the cylindrical actuator is servo-controlled at the reference value $L_0$, and thereafter the STM measurement is carried out.

As has been described above, according to the STM of this embodiment, the auto-focus operation and the auto-approach operation of the observation optical system in the STM in which the optical microscope is built can be carried out, and damage to the probe can be prevented.

The above-described two embodiments may be modified variously. For example, the first rough movement mechanism may be provided in the section of the object stage, and the probe unit may be fixed to the housing. In addition, the first rough movement mechanism may be provided on the stage and the second rough movement mechanism may be provided on the optical system, whereby these first and second mechanisms are driven in an interlocked manner or a separate manner. In this way, the distance between the surface of the object and the objective lens can be varied.

Figure 20:
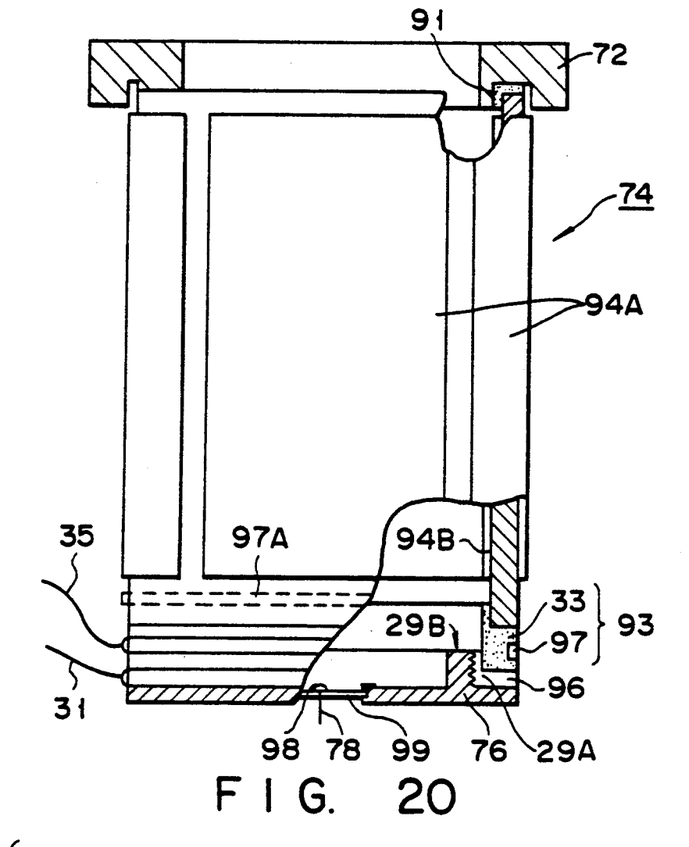
FIG. 20 shows an alternative to the probe unit shown in, for example, FIG. 4.

Referring now to FIG. 20, an alternative to the probe unit 68 shown in FIG. 4 will now be described. In FIG. 20, the structural elements, which were already described with reference to FIG. 4, are denoted by the same reference numerals.

In FIG. 20, a cylindrical piezoelectric actuator 74 is attached to an annular support 72 for supporting the piezoelectric body, with an annular insulator 91 interposed. The insulator 91 prevents electric discharge between the annular support 72 and surface electrodes 94A and 94B of the piezoelectric actuator 74. The end portion of the cylindrical piezoelectric actuator 74 is attached to a metallic outer frame 96 with a girdling member 93 (isolated electrode) interposed. The inner periphery of the metallic outer frame 96 is provided with a threaded portion 29A. The threaded portion 29A is engaged with a threaded portion 29B provided on the outer periphery of a probe holder 76. The probe holder 76 is thus coupled to the metallic outer frame 96. In the girdling member 93, a metallic film 97 is coated at a center area of the outer periphery of an annular insulator 33. The metallic film 97 is connected to the object table 28 through a lead 35 and is set to a ground potential level.

The girdling member 93 prevents leakage of AC component and DC component from the surface electrodes 94A and 94B of the cylindrical piezoelectric actuator 74 to the probe holder 76. Thus, noise in the tunnel current can be reduced. In addition, since the probe holder 76 is removable from the cylindrical piezoelectric actuator 74, the replacement of the probe can be facilitated.

The girdling member 93 and the cylindrical piezoelectric actuator 74 may be constituted as one body. That is, as is indicated by a broken line in FIG. 20, a metallic film 97A serving as a girdling electrode may be formed on the surface of the piezoelectric actuator 74. This structure prevents the decrease in hardness of the probe unit, which is due to the provision of the girdling member.

Referring to FIG. 20, if the outer periphery of the metallic outer frame 96 is connected to a tunnel current/bias voltage signal line 31 extending from the preamplifier 30, the electrical connection between the preamplifier 30 and the probe can be facilitated. In this case, the probe 78 on the probe holder 76 is electrically connected to the metallic outer frame 96 via an electrically conductive adhesive 98 and an electrically conductive transparent film 99.

Figure 21:
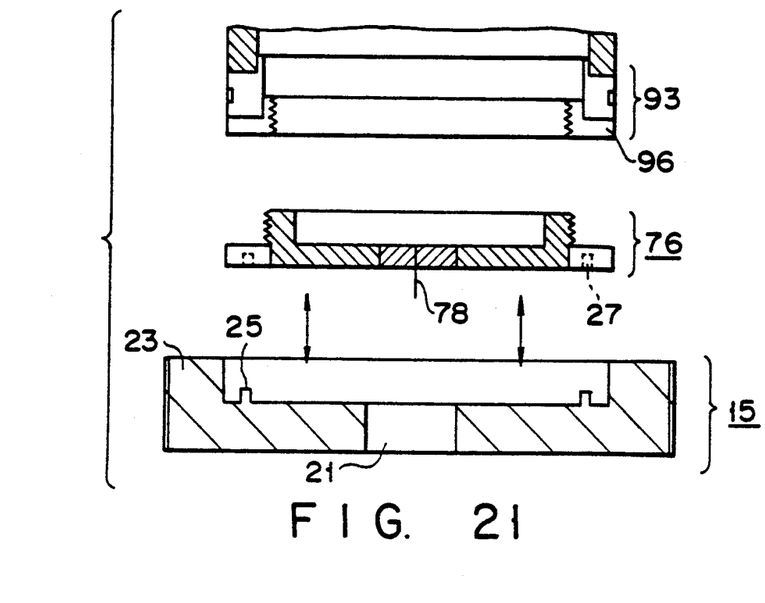
FIG. 21 shows a jig for attaching the probe holder to the probe unit in FIG. 20.

A jig for attaching the probe holder to the probe unit will now be described. FIG. 21 is a view for describing a jig 15. As is shown in FIG. 21, the jig 15 has a circular plate, at the center part of which a hole 21 for protecting the probe is cut, and a guide ring 23 provided on the outer periphery of the circular plate. Guide pins 25 are provided on that surface of the jig 15, which looks to the probe holder 76, so as to be fitted in holes 27 formed in the probe holder 76.

When the probe holder is attached to the probe unit by means of the jig 15 having the above structure, the probe holder 76 is supported so that the probe 78 is situated in the hole 21 of the jig 15. In this state, the jig 15 is rotated whereby the probe holder 76 is engaged with the metallic outer frame 96. Thus, the probe holder 76 can be surely engaged with the metallic outer frame 96, without causing damage to the tip of the probe 78.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is

1. A scanning tunneling microscope for observing a surface of an object, said microscope comprising:
an optical system, including an objective lens, for optically observing the surface of the object, the optical system having an optical axis;
first rough movement means for supporting the objective lens and for moving the objective lens along the optical axis of the optical system;
a probe unit including a probe for detecting a tunnel current, an optically transparent member for supporting the probe along the optical axis, and a piezoelectric driving body for causing the probe to scan the surface of the object; and
second rough movement means for supporting the probe unit, and including driving means for moving said probe unit along the optical axis of the optical system.

2. The microscope according to claim 1, wherein:
said first rough movement means includes an optical system fixing member which is movable along the optical system and supporting the optical system, and a motor for moving the optical system fixing member; and
said second rough movement means includes a probe unit support member for supporting the probe unit, said probe unit support member being supported on the optical system fixing member so as to be movable along the optical axis of the optical system, and a micrometer for moving the probe unit support member.

3. The microscope according to claim 2, wherein said micrometer includes a motor for driving the micrometer.

4. The microscope according to claim 1, wherein said piezoelectric driving body comprises a cylindrical piezoelectric actuator including a tube-shaped piezoelectric element, a common electrode provided within the piezoelectric element, and a plurality of driving electrodes provided outside the piezoelectric element.

5. The microscope according to claim 4, wherein the transparent member for supporting the probe is removably attached to the end portion of the cylindrical piezoelectric actuator, and
which further comprises an isolated electrode kept at a ground potential and provided between the driving electrodes and the probe.

6. The microscope according to claim 5, further comprising:
an XY-stage; and
an electrically conductive object table on the XY-stage, said connection member being attached to the object table with an insulator interposed therebetween, said object stage being on the object table, and said object table containing means for detecting a tunnel current.

7. A scanning tunneling microscopy method for observing a surface of an object using a scanning tunneling microscope comprising:
   an optical system, including an objective lens, for optically observing the surface of the object, the optical system having an optical axis;
   first rough movement means for supporting the objective lens and for moving the objecting lens along the optical axis of the optical system;
   a probe unit including a probe for detecting a tunnel current, an optically transparent member for supporting the probe along the optical axis, and a piezoelectric driving body for causing the probe to scan the surface of the object; and
   second rough movement means for supporting the probe unit and for moving the probe unit along the optical axis of the optical system;
   said method comprising the steps of:
   situating a tip portion of the probe at an optical microscopic focal point;
   moving the probe and the objective lens, as one body, to approach the object, while monitoring a tunnel current detected by the probe;
   stopping the movement of the probe and the objective lens, when the tunnel current is detected;
   retreating the probe from the optical microscopic focal point along the optical axis of the optical system by a predetermined distance; and
   identifying an observation area on the object by said optical system.

8. A scanning tunneling microscope for observing a surface of a sample, the microscope comprising;
   an insulating stage on which a conductive sample is placed;
   a conductive probe having a sharp tip end, supported close to the sample;
   scanning means for scanning a surface of said sample by moving at least one of said probe and sample relative to each other;
   applying means for applying a bias voltage between said sample and probe;
   tunnel current detecting means for detecting a tunnel current flowing between said sample and probe;
   an electrically conductive holding means for holding the sample on the stage by pressing the sample thereagainst; and
   a conductive connecting member, connected to said tunnel current detecting means, for fixing said holding means at to a predetermined position.

9. A scanning tunneling microscope for observing a surface of an object, said microscope comprising:
   an optical system, including an objective lens, for optically observing the surface of the object, the optical system having an optical axis;
   first rough movement means for supporting the objective lens and for moving the objective lens along the optical axis of the optical system;
   a probe unit including a probe for detecting a tunnel current, an optically transparent member for supporting the probe along the optical axis, and a piezoelectric driving body for causing the probe to scan the surface of the object; and
   second rough movement means for supporting the probe unit and for moving the probe unit along the optical axis of the optical system;
   said first rough movement means including an optical system fixing member which is movable along the optical system and supporting the optical system, and a motor for moving the optical system fixing member; and
   said second rough movement means including a probe unit support member for supporting the probe unit, said probe unit support member being supported on the optical system fixing member so as to be movable along the optical axis of the optical system, and amicrometer for moving the probe unit support member.

10. The microscope according to claim 9, wherein said micrometer includes a motor for driving the micrometer.

11. The microscope according to claim 9, wherein said piezoelectric driving body comprises a cylindrical piezoelectric actuator including a tube-shaped piezoelectric element, a common electrode provided within the piezoelectric element, and a plurality of driving electrodes provided outside the piezoelectric element.

12. The microscope according to claim 11, wherein the transparent member for supporting the probe is removably attached to the end portion of the cylindrical piezoelectric actuator; and
   which further comprises an isolated electrode kept at a ground potential and provided between the driving electrodes and the probe.

13. The microscope according to claim 12, further comprising:
   an XY-stage; and
   an electrically conductive object table on the XY-stage, said connection member being attached to the object table with an insulator interposed therebetween, said object stage being on the object table, and said object table containing means for detecting a tunnel current.

* * * * *